(12) United States Patent
Claesson et al.

(10) Patent No.: US 12,145,622 B2
(45) Date of Patent: Nov. 19, 2024

(54) METHOD FOR CONTROLLING A VEHICLE ASSEMBLED FROM A SET OF MODULES, A CONTROL DEVICE, A VEHICLE, A COMPUTER PROGRAM AND A COMPUTER-READABLE MEDIUM

(71) Applicant: Scania CV AB, Södertälje (SE)

(72) Inventors: André Claesson, Tullinge (SE); Linus Ährlig, Västerhaninge (SE); Robert Sjödin, Nyköping (SE); Sami Teppola, Nykvarn (SE); Mikko Kallio, Hölö (SE); Tomas Skeppström, Södertälje (SE); Morgan Colling, Hölö (SE)

(73) Assignee: Scania CV AB, Södertälje (SE)

( * ) Notice: Subject to any disclaimer, the term of this patent is extended or adjusted under 35 U.S.C. 154(b) by 551 days.

(21) Appl. No.: 17/052,559

(22) PCT Filed: Apr. 26, 2019

(86) PCT No.: PCT/SE2019/050378
§ 371 (c)(1),
(2) Date: Nov. 3, 2020

(87) PCT Pub. No.: WO2019/231370
PCT Pub. Date: Dec. 5, 2019

(65) Prior Publication Data
US 2021/0229701 A1    Jul. 29, 2021

(30) Foreign Application Priority Data

May 28, 2018 (SE) .................................... 1850639-4

(51) Int. Cl.
*B60W 60/00* (2020.01)
*B60R 16/023* (2006.01)
(Continued)

(52) U.S. Cl.
CPC ..... *B60W 60/0015* (2020.02); *B60R 16/0232* (2013.01); *B60R 25/30* (2013.01);
(Continued)

(58) Field of Classification Search
CPC ......... B60W 60/0015; B60W 50/0205; B60W 50/032; B60W 50/038; B60W 2050/0075;
(Continued)

(56) References Cited

U.S. PATENT DOCUMENTS 7,502,672 B1 * 3/2009 Kolls ..................... G06Q 30/06
340/988
9,079,505 B1 7/2015 Hyde et al. ..................... 701/22
(Continued)

FOREIGN PATENT DOCUMENTS

CN         103640493 A       3/2014
DE    10 2016 209 099 A1    7/2017
(Continued)

OTHER PUBLICATIONS

Novelty Search Report dated Jan. 29, 2018.
(Continued)

*Primary Examiner* — Isaac G Smith
(74) *Attorney, Agent, or Firm* — Banner & Witcoff, Ltd.

(57) ABSTRACT

A method for controlling a vehicle (1) assembled from a set of modules (20). The vehicle (1) includes: at least one drive module (30); and at least one functional module (40). The at least one drive module (30) has a pair of wheels (32) and is configured to autonomously operate and drive the assembled vehicle (1) wherein the modules (30, 40, 70, 80) of the vehicle (1) are configured to communicate with the control device (100). The method includes: receiving (s101) data from the modules (30, 40, 70, 80) of the vehicle (1), wherein the data includes a value of at least one parameter associated with a current condition of the modules (30, 40, 70, 80);

(Continued)

evaluating (s102) the received data by comparing the value of the at least one parameter with a predetermined value or value interval for the at least one parameter; and controlling (s103) the vehicle (1) based on the evaluation.

27 Claims, 4 Drawing Sheets

(51) Int. Cl.
*B60R 25/30* (2013.01)
*B60W 50/02* (2012.01)
*B60W 50/032* (2012.01)
*B60W 50/038* (2012.01)
*G05D 1/00* (2006.01)
*G07C 5/08* (2006.01)
*B60K 6/22* (2007.10)
*B60L 50/75* (2019.01)
*B60W 50/00* (2006.01)

(52) U.S. Cl.
CPC ...... *B60W 50/0205* (2013.01); *B60W 50/032* (2013.01); *B60W 50/038* (2013.01); *G05D 1/0214* (2013.01); *G07C 5/0808* (2013.01); *B60K 6/22* (2013.01); *B60L 50/75* (2019.02); *B60W 2050/0075* (2013.01); *B60W 2556/45* (2020.02)

(58) Field of Classification Search
CPC .. B60R 16/0232; B60R 25/30; G05D 1/0214; G07C 5/0808; B60K 6/22; B60L 50/75
USPC ............................................................ 701/2
See application file for complete search history.

(56) References Cited

U.S. PATENT DOCUMENTS

| | | | |
|---|---|---|---|
| 9,802,661 B1 | 10/2017 | Kentley-Klay | |
| 2004/0195014 A1* | 10/2004 | Chernoff | B60L 50/66 180/65.1 |
| 2008/0017426 A1* | 1/2008 | Walters | B60F 3/003 296/193.04 |
| 2015/0217819 A1 | 8/2015 | Pojidaev | |
| 2016/0129958 A1* | 5/2016 | Byrnes | B60L 15/32 180/12 |
| 2016/0207418 A1 | 7/2016 | Bergstrom et al. | |
| 2017/0197678 A1 | 7/2017 | Scaringe | |
| 2017/0278312 A1 | 9/2017 | Minster et al. | |
| 2018/0039285 A1 | 2/2018 | Giegel | |
| 2018/0050626 A1 | 2/2018 | Delp et al. | |
| 2018/0052463 A1 | 2/2018 | Mays | |
| 2018/0345971 A1* | 12/2018 | Birnschein | B60W 10/08 |
| 2019/0018413 A1* | 1/2019 | Wood | G05D 1/0214 |
| 2019/0204097 A1* | 7/2019 | Starns | G07C 5/008 |

FOREIGN PATENT DOCUMENTS

| | | |
|---|---|---|
| DE | 10 2018 002 229 A1 | 8/2018 |
| DE | 10 2017 216 207 A1 | 10/2018 |
| JP | 2005335525 A | 12/2005 |
| WO | WO 2013/000040 A1 | 1/2013 |
| WO | WO 2014/007729 A1 | 1/2014 |
| WO | WO 2018/222375 A1 | 12/2018 |

OTHER PUBLICATIONS

Office Action mailed Oct. 30, 2018 in corresponding Swedish Patent Application No. 1850639-4.
International Search Report mailed Jul. 1, 2019 in corresponding PCT International Application No. PCT/SE2019/050378.
Written Opinion mailed Jul. 1, 2019 in corresponding PCT International Application No. PCT/SE2019/050378.
S.A. Rogers, "Oiio's Transparent Modular Car of the Future Breaks All the Rules of the Road," 5 pages, URL address: https://dornob.com/oiios-transparent-modular-car-of-the-future-breaks-all-the-rules-of-the-road/; download date: Jan. 29, 2018.
Jun. 17, 2022—(CN) First Office Action—App. No. 201980034423.6.
European Search Report, dated Feb. 3, 2022, issued in corresponding European Patent Application No. 19811253.4. Total 9 pages.
Jun. 6, 2024—(EP) Article 94(3) Communication—App. No. 19811253.4.

* cited by examiner

METHOD FOR CONTROLLING A VEHICLE ASSEMBLED FROM A SET OF MODULES, A CONTROL DEVICE, A VEHICLE, A COMPUTER PROGRAM AND A COMPUTER-READABLE MEDIUM

CROSS-REFERENCE TO RELATED APPLICATIONS

The present application is a 35 U.S.C. §§ 371 national phase conversion of PCT/SE2019/050378, filed Apr. 26, 2019, the contents of which are incorporated herein by reference, which claims priority of Swedish Patent Application No. 1850639-4 filed May 28, 2018, the contents of which are incorporated by reference herein. The PCT International Application was published in the English language.

TECHNICAL FIELD

The present invention relates to a method for controlling a vehicle assembled from a set of modules. The present invention also relates to a control device, a vehicle, a computer program and a computer-readable medium.

BACKGROUND

Vehicles of today are typically manufactured for a specific purpose, e.g. a bus is manufactured for transporting people and a truck is manufactured for transporting goods. Such vehicles are typically manufactured and completely assembled in a factory or they may be partly assembled in a factory and completed at a body manufacturer. Once the vehicle is assembled, the vehicle will only be used for the specific purpose. Thus, a bus will only be used as a bus and a garbage truck will only be used as a garbage truck. Different vehicles are thus needed for different purposes, which may require a large fleet of vehicles and which may be very costly. A more flexible vehicle, which enables customization, may therefore be desired.

There are, for example, known solutions where a truck can be rebuilt by changing a concrete mixer to a loading platform. This increases the flexibility and two different functions can be achieved by means of one single vehicle. Depending on the modules, it may be desired to enable communication between the modules and/or between the modules and an offboard system. Document US 2017197673 A1 discloses a system for managing utilization of reconfigurable electric vehicles where a plurality of users are each paired with a vehicle from a pool of vehicles. Each vehicle is also paired with a removable structural module depending on user requirement. A remote monitoring system communicate with the vehicles to monitor vehicle systems, vehicle usage etc.

SUMMARY

Despite known solutions in the field, it would be desirable to achieve a way of controlling a vehicle assembled from a set of modules, which enables autonomous operation of such a vehicle with increased safety.

This is achieved by a method for controlling a vehicle assembled from a set of modules, a control device, a vehicle, a computer program and a computer-readable medium according to the independent claims.

Hence, according to an aspect of the present invention, a method, performed by a control device, for controlling a vehicle assembled from a set of modules is provided. The vehicle comprises at least one drive module; and at least one functional module, wherein the at least one drive module comprises a pair of wheels and is configured to be autonomously operated and drive the assembled vehicle, and wherein the modules of the vehicle are configured to communicate with the control device. The method comprises: receiving data from the modules of the vehicle, the data comprising a value of at least one parameter associated with a current condition of the modules; evaluating the received data by comparing the value of the at least one parameter with a predetermined value or value interval for the at least one parameter; and controlling the vehicle based on the evaluation.

According to another aspect of the invention, a control device configured for controlling a vehicle assembled from a set of modules is provided. The vehicle comprises at least one drive module and at least one functional module, wherein the at least one drive module comprises a pair of wheels and is configured to be autonomously operated and drive the assembled vehicle, and wherein the modules of the assembled vehicle are configured to communicate with the control device. The control device is configured to: receive data from the modules of the vehicle, the data comprising a value of at least one parameter associated with a condition of the modules; evaluate the received data by comparing the value of the at least one parameter with a predetermined value or value interval for the at least one parameter; and control the vehicle based on the evaluation.

According to yet another aspect of the invention a vehicle assembled from a set of modules is provided. The vehicle comprises at least one drive module and at least one functional module, wherein the at least one drive module comprises a pair of wheels and is configured to be autonomously operated and drive the assembled vehicle. The vehicle further comprises a control device as disclosed herein.

Assembling a vehicle from a set of modules makes it possible to dynamically assemble a modularized vehicle depending on a current mission or function to be performed. In this way, from the same set of modules, for example a truck, a garbage truck, a bus or a snowplough can be assembled. Not only will this result in an increased flexibility, but the cost for a vehicle owner will decrease significantly compared to having a plurality of different vehicles for different applications. By using at least one autonomously operated drive module, the drive module may autonomously/automatically perform physical connection and electrical connection with a second module. In this way, no manual work is required and the assembly of the vehicle is less cumbersome and much more time efficient. Autonomously operating a vehicle assembled from a set of modules may be demanding in terms of controlling the modules comprised in the vehicle. Each module is a separate individually controlled unit when not being comprised in a vehicle, but when it is forming part of an assembled vehicle the modules typically need to interact with each other. During operation of the vehicle, problems or abnormal behavior of various kind may occur and certain actions may have to be taken. In order to increase safety, it is also desirable to identify any potential problems before they occur. A problem occurring in a module of the vehicle may be detected or predicted by the module itself based on operational data and/or status data of the module. However, there may be data/events that are not conceived as problems or as abnormal by the individual module, but which could indicate a problem in combination with certain data/events of another module. Thus, by receiving data relating to a current condition of the module, from a plurality of modules of the vehicle, an overall picture may be achieved and a more accurate evaluation of the vehicle can be made. In this way, suitable actions, which will be described in more detail below, can be taken to, for example, prevent or at least alleviate problems, and safety of the vehicle may thereby be improved. In addition, collecting data from a plurality of modules enables identification of vehicle conditions that normally are detected by an operator of a manually operated vehicle. The vehicle can thereby be autonomously operated in a safe way.

A vehicle assembled from a set of modules may encounter different challenges and problems compared to conventional vehicles. The different modules and how they are controlled may affect the performance/operation of the vehicle. Operating such a vehicle autonomously puts even higher demands on the control of the vehicle. In order to be able to operate such a vehicle in a safe way, a method for controlling a vehicle assembled from a set of modules has been developed. A modularized vehicle according to the present disclosure is typically assembled and disassembled at the vehicle owner's premises. The vehicle owner typically buys a set of modules comprising a plurality of different modules to form different types of vehicles from a manufacturer and the assembly and disassembly is performed by the vehicle owner. The present disclosure is applicable on all sorts of vehicles with ground engaging means, such as wheels or tracks. However, the disclosure may relate to heavy vehicles, such as buses, trucks etc. Specifically, the present disclosure may relate to vehicles for use on public roads.

Typically, a vehicle operator, such as a fleet manager or vehicle owner, has a list of requested functions/missions to be performed. Such functions/missions could be transporting persons, goods, garbage or similar. In order to perform a certain function/mission, the operator requires a specific vehicle and the operator typically plans which vehicle to use, when, and for which mission. According to an example of the present disclosure, a control center receives information about at least one requested function/mission to be performed. Such a control center may also be referred to as an off-board system and may be configured for fleet management, vehicle assembly/disassembly and/or similar. The control center is thus arranged geographically at a distance from the modules and the assembled vehicle(s). In one example, the control center receives the information about the at least one function/mission to be performed from an operator via a user interface, such as a touch screen, keyboard or similar. In another example, the information regarding the function/mission is automatically obtained by the control center by means of for example Artificial Intelligence, based on requested functions/missions to be performed. When the control center has information about a function/mission to be performed, the control center may determine what type of vehicle is required to perform said function/mission. The control center may select modules to form the assembled vehicle based on the function to be performed by the assembled vehicle. The control center then transmits signals to the modules with the command of connecting physically with each other. The control center may also transmit instructions to the modules to connect electrically with each other. When the assembled vehicle has performed the mission/function, the vehicle owner may determine to disassemble the vehicle, for example in order to reuse one or more of the modules to assemble another type of vehicle.

According to an aspect of the present disclosure, a method, performed by a control device, for controlling a vehicle assembled from a set of modules is provided. The vehicle comprises at least one drive module; and at least one functional module, wherein the at least one drive module comprises a pair of wheels and is configured to be autonomously operated and drive the assembled vehicle, and wherein the modules of the vehicle are configured to communicate with the control device. The method comprises: receiving data from the modules of the vehicle, the data comprising a value of at least one parameter associated with a current condition of the modules; evaluating the received data by comparing the value of the at least one parameter with a predetermined value or value interval for the at least one parameter; and controlling the vehicle based on the evaluation. The data comprising a value of at least one parameter associated with a current condition of the module may be referred to as operational data and/or status data. The data, and thus the at least one parameter, may relate to speed, acceleration, retardation, brake force, travelled distance, operating time, steering, suspension, load, temperature etc. By evaluating this data and comparing it with predetermined values, potential problems may be predicted and/or detected and the vehicle can be controlled in a safe way. The data from the modules may be provided by means of sensor devices arranged in/on the respective module. Such sensor devices may comprise cameras, sound sensors, tactile sensors, pressure sensors, temperature sensors, gas detectors, radar, LIDAR or similar.

The set of modules from which the vehicle is assembled may comprise a plurality of drive modules and a plurality of functional modules. The set of modules may also comprise at least one energy storage module and/or at least one range extender module. The different drive modules of the set of modules may be identical or the drive modules may for example have different types/sizes of wheels, different suspension, different power capacity and/or different charge capacity. In one example, each drive module comprises a body provided with a pair of wheels arranged on two opposite sides of the drive module. In an example, the drive module comprises only one pair of wheels. The drive module comprises at least one propulsion unit connected to the pair of wheels. The propulsion unit may be an electric machine, connected to the wheels. The pair of wheels of the drive module may thus be referred to as drive wheels. In one example, the drive module comprises two electrical machines, one connected to each wheel. The electric machines may be arranged in the rim of the wheels. The wheels of the drive module can thus be driven independently of each other. The electric machines may also work as generators and generate electric power when braking the wheels. The drive module may also comprise a steering system connected to the wheels. In this way, the drive module is steerable. The drive module may also comprise a brake system for braking the wheels. According to an example, the brake system comprises a wheel brake for each wheel of the drive module. Redundancy is achieved in that the drive module can be steered by means of the electrical machines and/or the wheel brakes in the event that the steering system malfunctions. In one example, the drive module further comprises at least one energy storage unit for providing the propulsion unit with energy. The energy storage unit may be an electric battery. The electric battery may be rechargeable. The drive module being configured to be autonomously operated means that the drive module comprises a plurality of sensors and systems for steering and driving the drive module automatically as an independent unit according to conventional methods. An assembled vehicle comprising at least one drive module may thus be referred to as an autonomously operated vehicle. An autonomously operated vehicle does not require a driver inside the vehicle. According to an example, the drive module comprises a navigation system and sensors for detecting objects in the surrounding of the drive module. The drive module may be referred to as an autonomously operated vehicle in the sense that it is allowed to operate on public roads.

Each functional module is configured to perform a predetermined function while being part of an assembled vehicle. In one example, the functional module is configured to accommodate or support a load. The functional module may be configured for accommodating passengers and may together with at least one drive module form a bus. The functional module may alternatively be configured for transporting goods and may together with at least one drive module form a truck. The functional module may be any of a garbage truck body, a loading platform, a fork arrangement for a forklift, and a snowplough just to mention a few illustrative and non-limiting examples. The functional module may comprise trailing wheels, which are not driven or steerable. A functional module cannot move on its own but needs to be connected to at least one drive module to be able to move, wherein the functional module and the drive module together form a vehicle. The functional module may comprise an energy storage unit, such as a battery.

The at least one energy storage module is connectable to a drive module or a functional module. The at least one energy storage module comprises an interface for enabling transfer of electrical power between the energy storage module and the drive module/functional module. By including an energy storage module in the vehicle or connecting an energy storage module to the vehicle, the vehicle can be operated longer distances without having to charge the energy storage unit(s) of the vehicle. The at least one energy storage module may also be connectable to another energy storage module, whereby electrical power can be transferred between the two energy storage modules. The at least one energy storage module may also comprise an interface for transfer of electrical control signals between a drive module/functional module and the energy storage module, or between two different energy storage modules. The interface(s) of the at least one energy storage module may be wireless or conductive. The at least one energy storage module may also be configured to communicate with the control center arranged in communication with the vehicle.

The at least one range extender module is adapted to be connected to a drive module, a functional module or an energy storage module. The at least one range extender module may comprise a drive unit, a generator and an interface for transferring electrical power to a drive module, a functional module or an energy storage module. In the event that a vehicle has a mission in an area where charging of vehicle energy storage units is difficult or even impossible, a range extender module may be included in, or connected to, the vehicle. The range extender module will by means of the drive unit and the generator, generate electrical power that can be used by, for example, the drive module(s) of the vehicle to operate the vehicle. The at least one range extender module may further comprise a system for controlling the drive unit and the generator. According to an example, the drive unit of the at least one range extender module comprises an internal combustion engine. In this case, the at least one range extender module may also comprise a fuel tank with fuel for the internal combustion engine. Additionally or alternatively, the drive unit of the at least one range extender module comprises a fuel cell. The interface of the at least one range extender module may be wireless or conductive. The at least one range extender module may also be configured to communicate with the control center arranged in communication with the vehicle.

The modules of the vehicle according to the present disclosure may be physically connected through corresponding physical interfaces. Such physical interfaces may be configured in different ways, and may for example comprise coupling units adapted to engage, quick couplings, hooks, cooperating protrusions and recesses or similar. It is to be understood that the configuration of the physical interface is not part of the invention per se. Each module may comprise a physical interface for connection with another module on at least two different sides of the module. In this way, each module can be connected to another module in various ways and the flexibility is increased. The different physical interfaces for connection with another module may be identical on all sides of the first module. A drive module may comprise a physical interface both on a front side of the drive module and on a rear side of the drive module. The drive module can thereby be connected to a front section of a functional module and to a rear section of a functional module, without having to turn the drive module. Additionally or alternatively, the drive module may comprise a physical interface on a top side of the drive module. By using a standard interface, which can be used for connection with another drive module as well as a functional module, the flexibility of the drive module increases and the assembly of a vehicle are facilitated. The physical connection may be autonomously performed when it includes an autonomously operated drive module.

According to an example, evaluating the received data comprises comparing a value of the at least one parameter from one module with a value of the at least one parameter from another module. In one example, the vehicle comprises a functional module and two drive modules. By comparing values of the same parameter from the two drive modules, abnormal values can be identified. For example, if the two drive modules have different temperatures, or if the two drive modules have different acceleration behavior, there might be something wrong with one of them. Also, the change of the state of charge overtime may indicate a potential problem. As an example, if two essentially identical drive modules have 100% state of charge and both use similar power/torque during a certain period of time, the state of charge of the two drive modules should be essentially the same after this period of time. If this is not the case and if one of the drive modules has a lower state of charge than the other, there may be something wrong with e.g. the energy storage unit of one of the drive modules, the electrical engine of the drive module having the lower charge, or the brakes of the drive module having the lower charge, or the tires of the drive module having the lowest charge may have insufficient air pressure causing increased friction, just to mention some illustrative and non-limiting or non-exhausting examples. Another non-limiting example is that there might be something wrong with an electric engine of the drive module having the highest charge, perhaps the charge has hardly changed over a period of time indicating that the drive module may not be functioning properly, thereby forcing the other drive module to drive the vehicle causing its batteries to drain faster than expected.

Evaluating the received data may alternatively or additionally comprise detecting deviations from predetermined normal conditions. Thus, by comparing the value of at least one parameter associated with a current condition of the module(s) with a predetermined value or value interval for the at least one parameter, deviations from predetermined normal conditions can be detected. The predetermined value or value interval for the at least one parameter may correspond to a normal condition. Thus, if the value of the at least one parameter received from the modules differs from the predetermined value or value interval of the at least one parameter, it may be determined that there is a deviation from a normal condition. A deviation from a predetermined normal condition may lead to a serious problem and it is therefore important to detect such deviations in order to prevent potential problems. Evaluating the received data may comprise determining, based on the detected deviation(s), that the vehicle requires service, repair, and/or charging of at least one energy storage device of the vehicle. Thus, a detected deviation may relate to service, repair and/or charging of an energy storage unit. A detected deviation may thereby relate to the time since the last service, activated error codes and/or the status of charge (SOC) of an energy storage unit. As an example, it may be predetermined that a module should undergo service once a year. If it is detected that the time since the last service for a module is more than a year, a deviation from the normal condition relating to service is detected. Another example may be that certain fluids in a module of the vehicle should be exchanged after a predetermined travelled distance. If it is detected that the module has travelled this predetermined distance and the fluids have not been exchanged, a deviation from the normal condition is detected. As another example, it may be predetermined that the normal condition of an energy storage unit is to have a state of charge above a certain level. If it is determined that the current state of charge is below the predetermined level, a deviation from the normal condition is detected and it is determined that the vehicle needs charging. The method according to the present disclosure may thus be referred to as a method for identifying a need for service, repair and/or charging for a vehicle assembled from a set of modules.

Detected deviations from predetermined normal conditions may additionally or alternatively comprise wobbling tires, abnormal sounds, fire, break-in, vandalism, temperature changes inside a module and/or loose goods inside a module. Such deviations are normally detected manually by a driver inside a human operated vehicle. Since the vehicle is autonomously operated by means of the at least one drive module, it is crucial that also this kind of deviations are detected. Wobbling tires may be detected based on data from one or more accelerometers. Abnormal sounds may be detected by means of sound sensors, fire may be detected by means of temperature sensors and break-ins and vandalism may be detected by means of cameras. Temperature changes inside a module can be very problematic in the event that, for example, the functional module accommodates temperature sensitive goods. It is then very important that the temperature inside the functional module remain within allowed threshold values. An abnormal temperature increase in one of two drive modules may also indicate that something is wrong with the drive module having an increased temperature. For example, worn-out bearings may cause such temperature increase. Loose goods inside the functional module may be detected by means of sound sensors and weight sensors detecting that the load on a certain location inside the module has changed during transportation. It is to be understood that these are only examples of deviations and how they may be detected. Other deviations may also be detected during the evaluation of the data from the modules.

According to an example, evaluating the received data comprises categorizing the detected deviations based on severity. Controlling the vehicle based on the evaluation may then comprise controlling the vehicle based on the severity of the detected deviation. Some detected deviations may be more serious than others and the vehicle may therefore be controlled differently depending on the deviation. For example, a minor deviation, which does not affect the operation of the vehicle or the safety of the vehicle and the surroundings, may not be important to rectify immediately. Another deviation, which affects the safety of the vehicle and/or the surroundings, for example a deviation in the brakes of the vehicle or a detected fire or similar, may lead to immediate reactions of how to control the vehicle. According to an example, when a detected deviation is categorized with a high severity, controlling the vehicle comprises controlling the vehicle to a safe stop along the roadside. The detected deviations may be categorized on a scale, for example, from 1 to 10, where a deviation categorized as 1 is less severe than a deviation categorized as 10. Thus, when a detected deviation is categorized as 10, the vehicle may be controlled to a safe stop along the roadside. In this way, the vehicle is no longer operated and the risks associated with the deviation are thereby reduced. A safe stop means that the vehicle is controlled as soon as possible and as safely as possible to a stop along the roadside. When a detected deviation is categorized as 1, the vehicle may be controlled to operate as normal without rectifying the deviation. Categorizing the detected deviations may, for example, comprise comparing the detected deviations with a list of predetermined deviations and corresponding categorizations saved in a database. The detected deviations may thus be categorized by means of data mapping. Alternatively, the detected deviations may be categorized by means of machine learning.

Evaluating the received data may comprise determining when a detected deviation should be rectified. As previously mentioned some deviations are more severe than others and the vehicle may be controlled differently depending on the deviation. The step of evaluating the received data may thus comprise determining when a detected deviation should be rectified, based on the severity of the deviation. Determining when a detected deviation should be rectified may comprise comparing the detected and categorized deviation with a list of predetermined severity categorizations and corresponding times for rectification saved in a database. The database comprising the list of predetermined severity categorizations and corresponding times for rectification may be the same database as mentioned above, comprising predetermined deviations and corresponding categorizations. The database may thus comprise information about how soon a deviation with a certain categorization should be rectified. By data mapping, the control device may thereby determine when a detected deviation should be rectified. Alternatively, the time for rectification of a detected deviation may be determined by means of machine learning. The more severe a deviation is, the sooner should the deviation be rectified. Thus, if a deviation is determined to be very severe, and perhaps be categorized as 8-10, it may be determined that the deviation should be rectified immediately or as soon as possible. The vehicle may then be controlled to travel to the nearest workshop or charging station, depending on the deviation, as soon as possible. Another deviation may be determined to be less severe and it may thereby be determined that this deviation should be rectified within the day, within a week, within a month or within a year. This decision may be stored locally in the module comprising the deviation, such that it is remembered when the module is part of another vehicle in the future. The decision may also be stored in the control center arranged in communication with the vehicle, such that the control center has all information about detected deviations.

Evaluating the received data may additionally or alternatively comprise determining geographically where a detected deviation should be rectified. This may be determined based on geographical information from, for example, a navigation system. When it has been determined that the deviation should be rectified within the day or in the near future, the control device may also determine where the deviation should be rectified. In this way, the control device may identify that a workshop is located close to the planned route of the vehicle and that it therefore is advantageous that the vehicle is operated to the workshop to rectify the deviation. The control device may also inform the workshop that the vehicle will be arriving at a certain point in time and schedule an appointment for repair, service or charging. There may also be several different alternatives available for rectification of a detected deviation, wherein the control device may determine which is the most suitable alternative, considering the mission of the vehicle and the safety. For example, the deviation may be that the vehicle needs to charge an energy storage unit and there are three different charging stations along the route of the vehicle. The control device may determine that a first charging station would delay the mission more because of traffic jam and that a second charging station is too far away to reach with the available state of charge. The control device may then determine to control the vehicle to the third charging station.

The present disclosure also relates to a control device configured for controlling a vehicle assembled from a set of modules, the vehicle comprising: at least one drive module and at least one functional module, wherein the at least one drive module comprises a pair of wheels and is configured to be autonomously operated and drive the assembled vehicle, and wherein the modules of the assembled vehicle are configured to communicate with the control device. The control device is configured to: receive data from the modules of the vehicle, the data comprising a value of at least one parameter associated with a condition of the modules; evaluate the received data by comparing the value of the at least one parameter with a predetermined value or value interval for the at least one parameter; and control the vehicle based on the evaluation.

It will be appreciated that all the embodiments described for the method aspect of the invention performed by the control device are also applicable to the control device aspect of the invention; that is, the control device may be configured to perform any one of the steps of the method according to the various embodiments described above.

According to an example, the control device is implemented in a module of the vehicle, wherein the module is operating as a master. The module operating as a master will decide how to operate the modules operating as slaves. Typically, a drive module of the vehicle is appointed to operate as a master, and any other drive modules and the functional module will thereby be operating as slaves. The master drive module will thereby decide how to operate the slave drive module(s) and the functional module and thus how to operate the assembled vehicle. In the event that the control device is comprised in a master module, the other modules of the vehicle may comprise control units arranged in communication with the control device. Receiving data from the modules thus means that control units of the modules transmit data to the control device of the master module. The control center may appoint which module to operate as a master and which to operate as slave(s) when assembling the vehicle. The control center may appoint the module to operate as master, for example, based on the state of charge of the energy storage units of the modules and/or the main travel direction of the assembled vehicle. According to another example, the assembled vehicle itself determines which module to operate as a master and which module(s) to operate as slave(s). When the control device is comprised in a module operating as a master, the control device may be configured to transmit control signals to the various systems and components of the modules of the vehicle for controlling, for example, the steering and the propulsion of the vehicle. The control device may thereby be adapted to operate the modules autonomously based on received commands, e.g. from the control center, and based on sensor input regarding its surroundings and positioning. The control device is in that case adapted to receive commands from a remotely located control center and to convert the command into control signals for controlling the various systems and components of the modules. The control device may be configured to receive data about the surroundings from various sensor devices, and based on this data, control the vehicle. The control device may also be adapted to communicate with traffic systems of various kinds. The control device may thereby be able to determine the status of a traffic light, determine if an accident has occurred and based on that, determine a new route for the vehicle, or itself if not being part of a vehicle. The control device may be adapted to communicate directly with such traffic systems or it may be adapted to communicate with such traffic systems via the control center. In the event that the control device is implemented in a module operating as a master, the result of the evaluation may be transmitted from the control device to the control center. In this way, the control center will also have an overall picture of the status of the vehicle and its modules, which may be useful when the control center later uses the same modules for assembling other vehicles.

According to another example, the control device is implemented in a control center arranged externally of the vehicle in communication with the vehicle. Such a control center or offboard system has been discussed previously in this disclosure and is arranged geographically at a distance from the set of modules and the vehicle assembled from the set of modules. The control center may be adapted to receive information about missions or functions to be performed and based on this mission/function, initiate assembly of a vehicle. The control center may also be configured to initiate disassembly of the vehicle. The control center being arranged in communication with the assembled vehicle means that the control center is arranged in communication with at least one module of the assembled vehicle. Thus, the control center is arranged in communication with at least one control unit of a module of the vehicle. In the event that the control device is comprised in the control center, controlling the vehicle based on the evaluation comprises transmitting commands to at least one control unit of the vehicle. If the control device is implemented in the control center, the control device may transmit commands to a module of the vehicle operating as a master, in order to control the vehicle. The master module may then control the vehicle accordingly. In the event that the control device is comprised in the control center, at least one of the modules of the vehicle comprises a control unit arranged on communication with the control device. Receiving data from the modules thus means that the control units of the modules transmit data to the control device. The module operating as a master may comprise a control unit arranged to communicate with the control device.

The control device may be implemented as a separate entity or distributed in two or more physical entities. The control device may comprise one or more computers. The control device may thus be implemented or realized by the control device comprising a processor and a memory, the memory comprising instructions, which when executed by the processor, causes the control device to perform the herein disclosed method steps.

The present disclosure also relates to a computer program comprising instructions which, when the program is executed by a computer, causes the computer to carry out the method disclosed above. The invention further relates to a non-transitory computer-readable medium comprising instructions, which when executed by a computer causes the computer to carry out the method disclosed above.

Furthermore, the present disclosure relates to a vehicle assembled from a set of modules, the vehicle comprising: at least one drive module; and at least one functional module, wherein the at least one drive module comprises a pair of wheels and is configured to be autonomously operated and drive the assembled vehicle. The vehicle further comprises a control device as disclosed herein. Thus, in this case the control device is comprised in a module of the vehicle.

The vehicle may comprise an energy storage module connected to the at least one drive module, wherein the energy storage module comprises an interface for enabling transfer of electrical power between the energy storage module and the at least one drive module. The vehicle may additionally or alternatively comprise a range extender module connected to the at least one drive module or energy storage module, wherein the range extender module comprises a drive unit, a generator and an interface for transferring electrical power from the range extender module to the at least one drive module or the energy storage module. The drive unit of the range extender module may comprise an internal combustion engine or a fuel cell.

Further objects, advantages and novel features of the present invention will become apparent to one skilled in the art from the following details, and by putting the invention into practice. Whereas embodiments of the invention are described below, it should be noted that the invention is not restricted to the specific details described. Skilled persons having access to the teachings herein will recognise further applications, modifications and incorporations within other fields, which are within the scope of the invention.

BRIEF DESCRIPTION OF THE DRAWINGS

For fuller understanding of the present invention and further objects and advantages of it, the detailed description set out below should be read together with the accompanying drawings, in which the same reference notations denote similar items in the various diagrams, and in which.

DETAILED DESCRIPTION

The present disclosure will now be further illustrated with reference to the appended figures.

Figure 1:
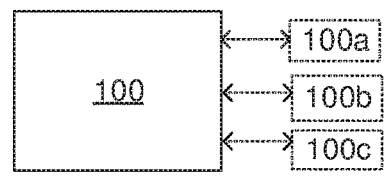
FIG. 1 schematically illustrates a control device according to an embodiment.

FIG. 1 schematically illustrates a control device 100 configured for controlling a vehicle assembled from a set of modules. The vehicle comprises: at least one drive module and at least one functional module, wherein the at least one drive module comprises a pair of wheels and is configured to be autonomously operated and drive the assembled vehicle. The modules of the assembled vehicle are configured to communicate with the control device. The vehicle, the set of modules, the at least one drive module, the at least one functional module are disclosed in FIGS. 2 and 3. The control device 100 is configured to: receive data from the modules of the vehicle, the data comprising a value of at least one parameter associated with a condition of the modules; evaluate the received data by comparing the value of the at least one parameter with a predetermined value or value interval for the at least one parameter; and control the vehicle based on the evaluation. The control device 100 is thus configured to communicate with control units 100*a*, 100*b*, 100*c* of the modules of the vehicle. In this figure only three control units 100*a*, 100*b*, 100*c* are illustrated. It is, however, to be understood that the control device 100 may be arranged in communication with one or more control units 100*a*, 100*b*, 100*c* of the vehicle.

According to an example, the control device 100 is implemented in a module of the vehicle, the module operating as a master. The module operating as a master will decide how to operate the modules operating as slaves. Typically, a drive module of the vehicle is appointed to operate as a master, and any other drive modules and the functional module will thereby be operating as slaves. When the control device 100 is comprised in a module operating as a master, the control device 100 may be configured to transmit control signals to the various systems and components of the modules of the vehicle for controlling for example the steering and the propulsion of the vehicle. The control device 100 may thereby be adapted to operate the modules autonomously based on received commands, e.g. from a control center (not shown), and based on sensor input regarding its surroundings and positioning. The control device 100 may be configured to receive data about the surroundings from various sensor devices, and based on this data, control the vehicle. In the event that the control device 100 is implemented in a module operating as a master, the control device 100 may be configured to transmit the result of the evaluation to the control center.

According to another example, the control device 100 is implemented in a control center arranged externally of the vehicle in communication with the vehicle. The control center, also referred to as offboard system, is arranged geographically at a distance from the set of modules and the vehicle assembled from the set of modules. In the event that the control device 100 is comprised in the control center, the control device 100 is configured to control the vehicle based on the evaluation by transmitting commands to at least one control unit 100*a*, 100*b*, 100*c* of the vehicle. If the control device 100 is implemented in the control center, the control device 100 may be configured to transmit commands to a module of the vehicle operating as a master, in order to control the vehicle.

The control device 100 may be configured to compare a value of the at least one parameter from one module with a value of the at least one parameter from another module. The control device 100 may thus be configured to evaluate the received data by comparing a value of at least one parameter from one module with a value of the at least one parameter from another module.

The control device 100 may further be configured to detect deviations from predetermined normal conditions. The control device 100 may thus be configured to evaluate the received data by detecting deviations from predetermined normal conditions. Furthermore, the control device 100 may be configured to determine, based on the detected deviations, that the vehicle requires service, repair or charging of at least one energy storage device of the vehicle.

According to an example, the control device 100 is configured to categorize detected deviations based on severity. The control device 100 may be configured to categorize the detected deviations from 1 to 10, where a deviation categorized as 1 is less severe than a deviation categorized as 10. The control device 100 may be configured to categorize the detected deviations by comparing the detected deviations with a list of predetermined deviations and corresponding categorizations saved in a database. The control device 100 may thus be configured to categorize the detected deviations by means of data mapping. The control device 100 may then be configured to control the vehicle based on the severity of a detected deviation. For example, the control device 100 is configured to, when a detected deviation is categorized with high severity, control the vehicle to a safe stop along the roadside.

The control device 100 is, according to an example, configured to determine when a detected deviation should be rectified. The control device 100 may be configured to determine when a detected deviation should be rectified, based on the severity of the deviation. The control device 100 may be configured to determine when a detected deviation should be rectified by comparing the detected and categorized deviation with a list of predetermined severity categorizations and corresponding times for rectification saved in a database, that is, the control device 100 may be configured to determine that a detected deviation should be rectified immediately, within a couple of hours, within the day, within a week, within a month or similar. The control device 100 may also be configured to determine geographically where a detected deviation should be rectified. For example, the control device 100 is configured to determine where a deviation should be rectified, based on the severity of the deviation as well as geographical data.

The control device 100 may be implemented as a separate entity or distributed in two or more physical entities. The control device 100 may comprise one or more computers. The control device 100 may thus be implemented or realized by the control device 100 comprising a processor and a memory, the memory comprising instructions, which when executed by the processor, causes the control device to perform the method as disclosed in FIG. 4.

Figure 2:
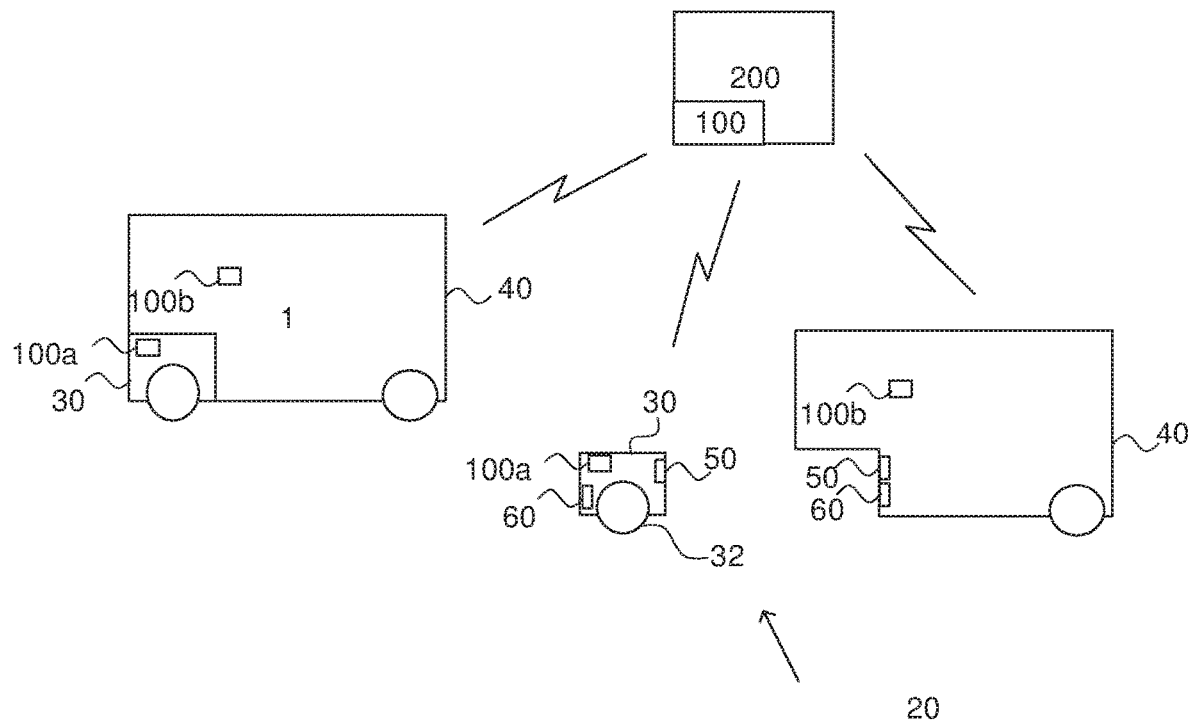
FIG. 2 schematically illustrates an application of a control device according to an embodiment.

FIG. 2 schematically illustrates an example of an application of a control device 100. The control device 100 is configured as disclosed in FIG. 1. The Figure illustrates a set of modules 20 and a vehicle 1 assembled from the set of modules 20. In this example, the set of modules 20 comprises a drive module 30 and a functional module 40, but it is to be understood that the set of modules 20 may comprise a plurality of drive modules 30 and functional modules 40. The drive module 30 comprises a pair of wheels 32 and is configured to be autonomously operated. Each module 30, 40 comprises at least one interface 50 releasably connectable to a corresponding interface 50 on another module 30, 40. The modules 30, 40 may comprise at least one physical interface and at least one electrical interface. The interfaces 50 on the drive modules 30 and the functional modules 40 respectively, may be arranged on corresponding positions to enable connection between the modules 30, 40. The interfaces 50 on the modules 30, 40 may be configured to transfer electrical control signals and/or to transfer electrical power between the modules 30, 40. By combining drive modules 30 and functional modules 40, different types of vehicles 1 can be achieved. In this Figure, the assembled vehicle 1 comprises one drive module 30 and one functional module 40. It is, however, to be understood that the vehicle 1 may comprise a plurality of drive modules 30. In this example, the functional module 40 comprises wheels, which are not driven, but the functional module 40 might just as well be configured without any wheels, whereby at least two drive modules 30 are required.

In this example, the control device 100 is implemented in a control center 200 arranged in communication with the vehicle 1. The control center 200, also referred to as an offboard system, is arranged geographically at a distance from the set of modules 20 and the vehicle 1 assembled from the set of modules 20. The control center 200 may be configured for fleet management, vehicle assembly/disassembly or similar. Each module 30, 40 comprises a control unit 100*a*, 100*b* configured to communicate with the control center 200, and thus the control device 100. The control center 200 may be configured to transmit commands to at least one control unit 100*a*, 100*b* of the vehicle 1, whereby the vehicle 1 is autonomously operated based on the commands. Each module 30, 40 comprises communication means for communication with another module 30, 40. The communication means may be comprised in the electrical interface 50 of each module 30, 40. The communication means are configured for transfer of electrical control signals and/or electrical power between the modules. The communication means of each module 30, 40 are controlled by the control units 100*a*, 100*b* of the module 30, 40. The communication means may comprise an internal communication network, such as CAN J1939, Flexray, Ethernet, fiber or similar. The communication means may additionally or alternatively comprise a transmitter and a receiver for wireless communication between the modules 30, 40. Each module 30, 40 may also comprise at least one sensor device 60 arranged in communication with the respective control unit 100*a*, 100*b*. The at least one sensor device 60 may be configured to provide operational data and status data of the respective module 30, 40, 70, 80.

Figure 3:
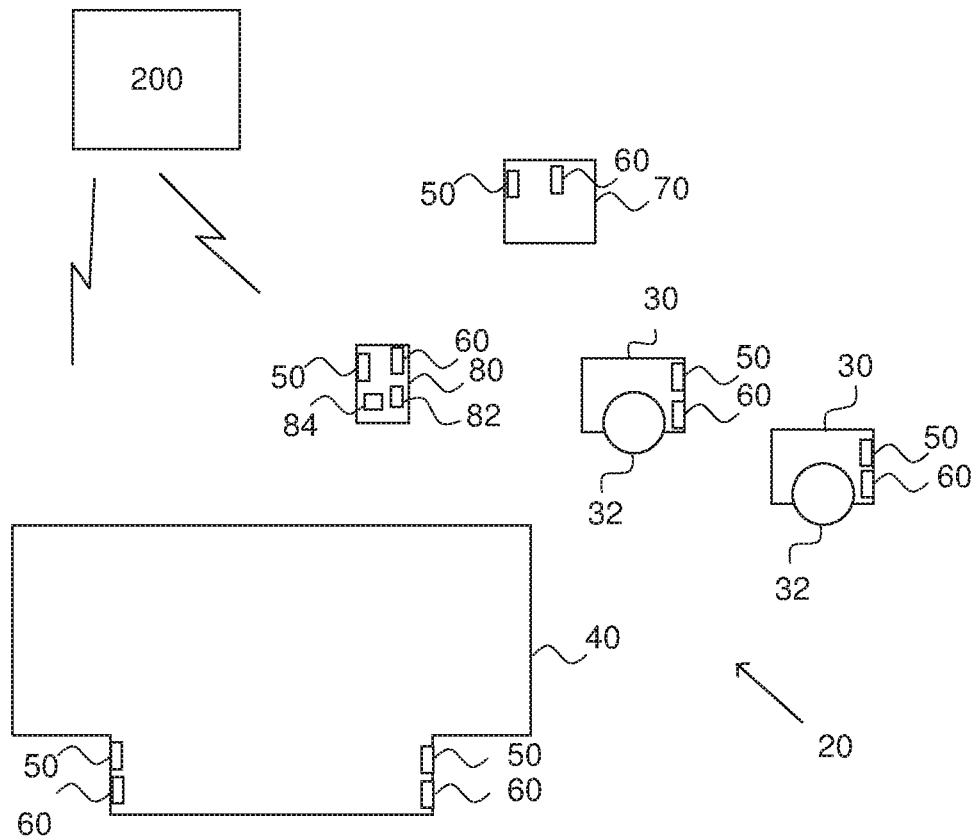
FIG. 3 schematically illustrates an application of a control device according to an embodiment.
Figure 3:
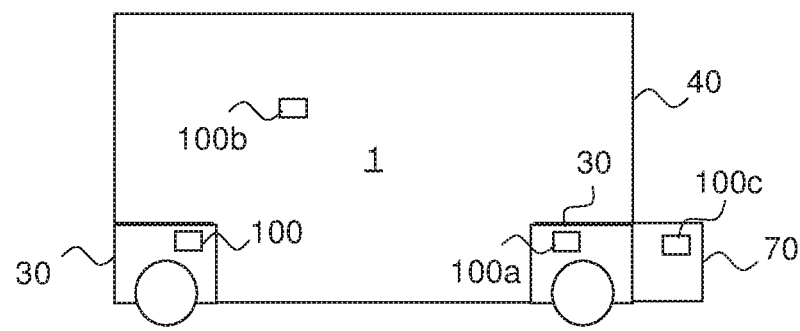

FIG. 3 schematically illustrates an example of an application of a control device 100. The control device 100 is configured as disclosed in FIG. 1. The Figure illustrates a set of modules 20 and a vehicle 1 assembled from the set of modules 20. In this example, the set of modules 20 comprises two drive modules 30, a functional module 40, an energy storage module 70 and a range extender module 80. It is, however, to be understood that the set of modules 20 may comprise a plurality of drive modules 30, functional modules 40, energy storage modules 70 and range extender modules 80. Each drive module 30 comprises a pair of wheels 32 and is configured to be autonomously operated. Each module 30, 40, 70, 80 comprises at least one interface 50 releasably connectable to a corresponding interface on another module 30, 40, 70, 80. The modules 30, 40, 70, 80 may comprise at least one physical interface and at least one electrical interface. The interfaces 50 on the modules 30, 40, 70, 80 may be configured for transfer of electrical control signals and/or transfer of electrical power. The interfaces 50 on the modules 30, 40, 70, 80 may be arranged on corresponding positions to enable connection between the modules 30, 40, 70, 80. The range extender module 80 comprises a drive unit 82, a generator 84 and an interface 50 for transferring electrical power to a drive module 30, a functional module 40 or an energy storage module 70. By combining drive modules 30 and functional modules 40, different types of vehicles 1 can be achieved. In this Figure, the assembled vehicle 1 comprises two drive modules 30, one functional module 40 and one energy storage module 70. The energy storage module 70 is connected to one of the drive modules 30 and may be configured to transfer electrical power to at least one of the drive modules 30.

In this example, the control device 100 is implemented in a module 30 of the vehicle 1. The control device 100 is comprised in a drive module 30 of the vehicle 1, which drive module 30 is operating as a master. The other drive module 30, the functional module 40 and the energy storage module 70 are in this example operating as slaves. A control center 200, also referred to as an offboard system, is arranged geographically at a distance from the set of modules 20 and the vehicle 1 assembled from the set of modules 20. The control center 200 may be configured for fleet management, vehicle assembly/disassembly or similar. Each of the modules 30, 40, 70 operating as slaves comprises a control unit 100a, 100b, 100c configured to communicate with the control device 100. The control units 100a, 100b, 100c and the control device 100 are each configured to communicate with the control center 200. The control center 200 may be configured to transmit commands to the control device 100, whereby the control device 100 controls the modules 30, 40, 70 of the vehicle 1 autonomously based on the commands. The vehicle 1 may thus be referred to as an autonomously operated vehicle.

Each module 30, 40, 70, 80 comprise communication means for communication with another module 30, 40. The communication means may be comprised in the electrical interface 50 of each module 30, 40, 70, 80. The communication means of each module 30, 40, 70, 80 are controlled by the control units 100a, 100b, 100c and the control device 100 of the respective module 30, 40, 70, 80. The communication means may comprise an internal communication network, such as CAN J1939, Flexray, Ethernet, fiber or similar. The communication means may additionally or alternatively comprise a transmitter and a receiver for wireless communication between the modules 30, 40. The communication means are configured for transfer of electrical control signals and/or electrical power between the modules. Each module 30, 40, 70, 80 may also comprise at least one sensor device 60 arranged in communication with the respective control unit 100a, 100b, 100c or control device 100. The at least one sensor device 60 may be configured to provide operational data and status data of the respective module 30, 40, 70, 80.

Figure 4:
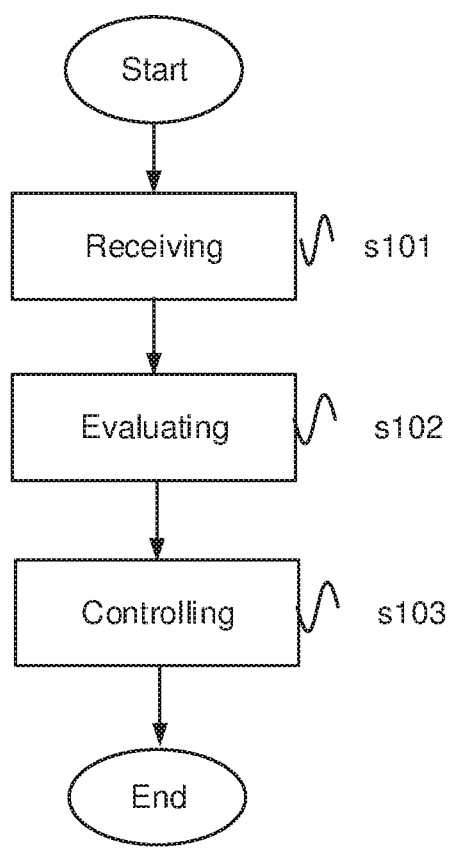
FIG. 4 illustrates a flow chart for a method according to an embodiment.

FIG. 4 illustrates a flow chart for a method, performed by a control device, for controlling a vehicle assembled from a set of modules. The method thus relates to a vehicle 1 as disclosed in FIG. 2 and FIG. 3 and to a control device 100 as disclosed in FIG. 1. The vehicle 1 thus comprises at least one drive module 30 and at least one functional module 40. The method comprises: receiving s101 data from the modules 30, 40, 70, 80 of the vehicle 1, the data comprising a value of at least one parameter associated with a current condition of the modules 30, 40, 70, 80; evaluating s102 the received data by comparing the value of the at least one parameter with a predetermined value or value interval for the at least one parameter; and controlling s103 the vehicle 1 based on the evaluation.

Evaluating s102 the received data may comprise comparing a value of the at least one parameter from one module 30, 40, 70, 80 with a value of the at least one parameter from another module 30, 40, 70, 80. The comparison may be performed on values from modules 30, 40, 70, 80 of the same type, for example on values from two drive modules. Evaluating s102 the received data may alternatively or additionally comprise detecting deviations from predetermined normal conditions. Thus, by comparing the value of at least one parameter associated with a current condition of the modules with a predetermined value or value interval for the at least one parameter, deviations from predetermined normal conditions can be detected. Detected deviations from predetermined normal conditions may comprise wobbling tires, abnormal sounds, fire, break-in, vandalism, temperature changes inside a module and/or loose goods inside a module. Evaluating s102 the received data may comprise determining, based on detected deviations, that the vehicle 1 requires service, repair, and/or charging of at least one energy storage unit of the vehicle 1. Thus, a detected deviation may relate to service, repair and/or charging of an energy storage unit.

According to an example, evaluating s102, the received data comprises categorizing the detected deviations based on severity. Controlling s103 the vehicle 1 based on the evaluation may then comprise controlling s103 the vehicle 1 based on the severity of the detected deviation. Categorizing the detected deviations may, for example, comprise comparing the detected deviations with a list of predetermined deviations and corresponding categorizations saved in a database. According to an example, when a detected deviation is categorized with a high severity, controlling s103 the vehicle 1 comprises controlling s103 the vehicle 1 to a safe stop along the roadside. The detected deviations may be categorized on a scale, for example, from 1 to 10, where a deviation categorized as 1 is less severe than a deviation categorized as 10.

Evaluating s102 the received data may further comprise determining when a detected deviation should be rectified. As previously mentioned, some deviations are more severe than others and the vehicle may be controlled differently depending on the deviation. The step of evaluating s102 the received data may thus comprise determining when a detected deviation should be rectified based on the severity of the deviation. Determining when a detected deviation should be rectified may comprise comparing the detected and categorized deviation with a list of predetermined severity categorizations and corresponding times for rectification saved in a database. The method may also comprise storing the decision of when to rectify the deviation in the control device 100.

Evaluating s102 the received data may additionally or alternatively comprise determining geographically where a detected deviation should be rectified. This may be determined based on geographical information from, for example, a navigation system.

Figure 5:
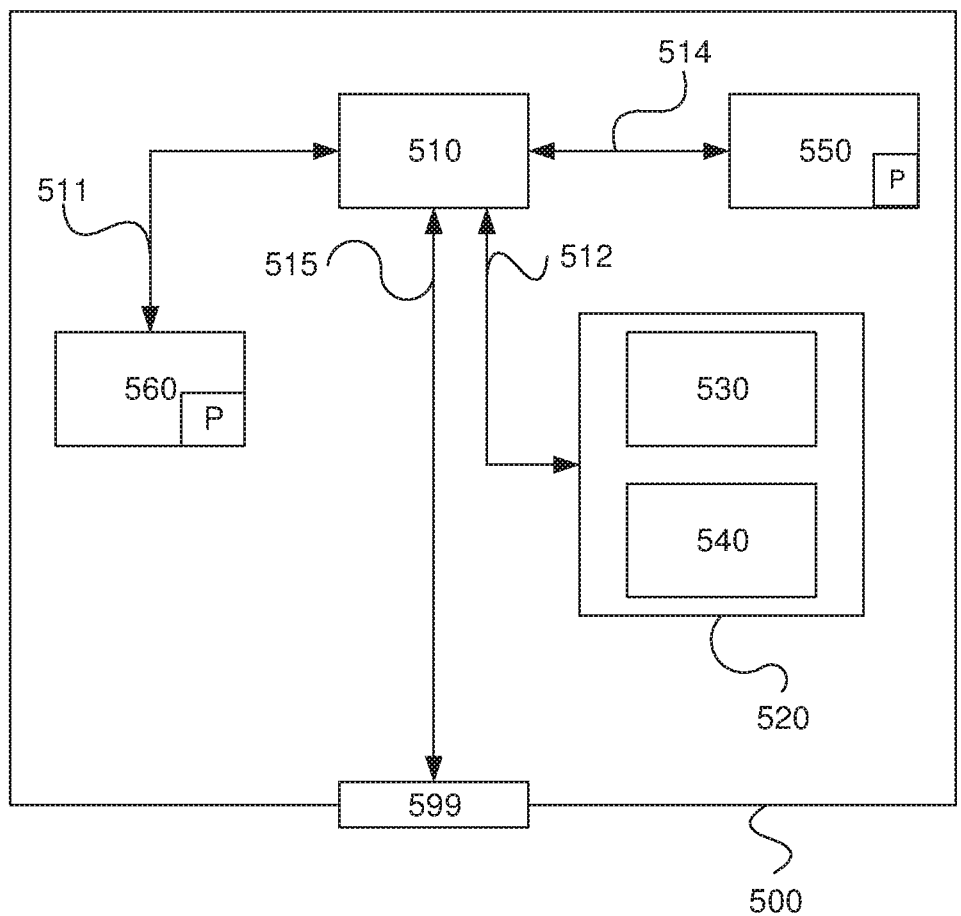
FIG. 5 schematically illustrates a control device or computer according to an embodiment.

FIG. 5 is a diagram of a version of a device 500. The control device 100 described with reference to FIGS. 1-4 may in a version comprise the device 500. The device 500 comprises a non-volatile memory 520, a data processing unit 510 and a read/write memory 550. The non-volatile memory 520 has a first memory element 530 in which a computer program, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

There is provided a computer program P, which comprises routines for controlling a vehicle, assembled from a set of modules. The program P may be stored in an executable form or in a compressed form in a memory 560 and/or in a read/write memory 550.

Where the data processing unit 510 is described as performing a certain function, it means that the data processing unit 510 effects a certain part of the program stored in the memory 560 or a certain part of the program stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit 510 via a data bus 511. The read/write memory 550 is adapted to communicating with the data processing unit 510 via a data bus 514.

When data are received on the data port 599, they are stored temporarily in the second memory element 540. When input data received have been temporarily stored, the data processing unit 510 is prepared to effect code execution as described above.

Parts of the methods herein described may be effected by the device 500 by means of the data processing unit 510, which runs the program stored in the memory 560 or the read/write memory 550. When the device 500 runs the program, methods herein described are executed.

The foregoing description of the preferred embodiments of the present invention is provided for illustrative and descriptive purposes. It is not intended to be exhaustive or to restrict the invention to the variants described. Many modifications and variations will obviously be apparent to one skilled in the art. The embodiments have been chosen and described in order best to explain the principles of the invention and its practical applications and hence make it possible for specialists to understand the invention for various embodiments and with the various modifications appropriate to the intended use.

The invention claimed is:

1. A method, performed by a control device, for controlling a vehicle, wherein the vehicle is assembled from modules comprising at least one drive module and at least one functional module configured to be connected to the at least one drive module, wherein the at least one drive module comprises a pair of wheels and is configured to be autonomously operated and drive the vehicle, and wherein the modules of the vehicle are configured to communicate with the control device, the method comprising:
    receiving data from the modules of the vehicle, the data comprising values of at least one parameter associated with a current condition of the modules;
    evaluating the received data based on comparing a value of the at least one parameter from one of the modules with a value of the at least one parameter from another one of the modules; and
    controlling the vehicle based on the evaluation.

2. The method according to claim 1, wherein the evaluating of the received data comprises comparing the value of the at least one parameter from one of the modules with a predetermined value for the at least one parameter.

3. The method according to claim 1, wherein the evaluating of the received data comprises detecting deviations from predetermined normal conditions.

4. The method according to claim 3, wherein the evaluating of the received data comprises determining, based on the detected deviations, that the vehicle requires service, repair, or charging of at least one energy storage device of the vehicle.

5. The method according to claim 3, wherein evaluating of the received data comprises categorizing detected deviations based on severity.

6. The method according to claim 5, wherein, controlling the vehicle based on the evaluation comprises controlling the vehicle based on the severity of a detected deviation.

7. The method according to claim 6, wherein, when a detected deviation is categorized with high severity, controlling the vehicle comprises controlling of the vehicle to a safe stop along a roadside.

8. The method according to claim 3, wherein evaluating of the received data comprises determining when a detected deviation should be rectified.

9. The method according to claim 3, wherein evaluating of the received data comprises determining geographically where a detected deviation should be rectified.

10. The method according to claim 1, wherein the control device is implemented in the drive module of the vehicle.

11. The method according to claim 1, wherein the control device is implemented in a control center arranged externally of the vehicle and in communication with the vehicle, and wherein controlling the vehicle comprises transmitting commands to at least one control unit of the vehicle.

12. A non-transitory computer-readable medium comprising instructions, which when executed by a computer device, cause the computer device to:
    receive data from modules of a vehicle,
        wherein the data comprises values of at least one parameter associated with a current condition of the modules,
        wherein the modules comprise at least one drive module and at least one functional module configured to be connected to the at least one drive module,
        wherein the at least one drive module comprises a pair of wheels and is configured to be autonomously operated and drive the vehicle, and
        wherein the modules of the vehicle are configured to communicate with a control device;
    evaluate the received data based on comparing a value of the at least one parameter from one of the modules with a value of the at least one parameter from another one of the modules; and
    control the vehicle based on the evaluation.

13. A control device configured for controlling a vehicle, wherein the vehicle is assembled from modules comprising:
    at least one drive module; and
    at least one functional module configured to be connected to the at least one drive module;
    wherein the at least one drive module comprises a pair of wheels and is configured to be autonomously operated and drive the vehicle, and wherein the modules of the vehicle are configured to communicate with the control device; and
    wherein the control device is configured to:
        receive data from the modules of the vehicle, the data comprising values of at least one parameter associated with a condition of the modules;
        evaluate the received data based on comparing a value of the at least one parameter from one of the modules with a value of the at least one parameter from another one of the modules; and
        control the vehicle based on the evaluation.

14. The control device according to claim 13, wherein the control device is configured to compare the value of the at least one parameter from one of the modules with a predetermined value for the at least one parameter.

15. The control device according to claim 13, wherein the control device is configured to detect deviations from predetermined normal conditions.

16. The control device according to claim 15, wherein the control device is configured to determine, based on detected deviations, that the vehicle requires service, repair or charging of at least one energy storage device of the vehicle.

17. The control device according to claim 15, wherein the control device is configured to categorize detected deviations based on severity.

18. The control device according to claim 17, wherein, the control device is configured to control the vehicle based on the severity of a detected deviation.

19. The control device according to claim 18, wherein the control device is configured to, when a detected deviation is categorized with high severity, control the vehicle to a safe stop along a roadside.

20. The control device according to claim 15, wherein the control device is configured to determine when a detected deviation should be rectified.

21. The control device according to claim 15, wherein the control device is configured to determine geographically where a detected deviation should be rectified.

22. The control device according to claim 13, wherein the control device is implemented in the drive module of the vehicle.

23. The control device according to claim 13, wherein the control device is implemented in a control center arranged externally of the vehicle and in communication with the vehicle, and wherein the control device is configured to control the vehicle by transmitting commands to at least one control unit of the vehicle.

24. A vehicle comprising a control device configured for controlling the vehicle, wherein the vehicle is assembled from modules comprising:
at least one drive module; and
at least one functional module configured to be connected to the at least one drive module;
wherein the at least one drive module comprises a pair of wheels and is configured to be autonomously operated and drive the vehicle, wherein the control device is configured to:
receive data from the modules of the vehicle, the data comprising values of at least one parameter associated with a condition of the modules;
evaluate the received data based on comparing a value of the at least one parameter from one of the modules with a value with a value of the at least one parameter from another one of the modules; and
control the vehicle based on the evaluation.

25. The vehicle according to claim 24, the vehicle further comprising:
an energy storage module connected to the at least one drive module, wherein the energy storage module comprises an interface for enabling transfer of electrical power between the energy storage module and the at least one drive module.

26. The vehicle according to claim 24, the vehicle further comprising: a range extender module connected to the at least one drive module or an energy storage module;
wherein the range extender module comprises a drive unit, a generator and an interface for transferring electrical power from the range extender module to the at least one drive module or the energy storage module.

27. The vehicle according to claim 26, wherein the drive unit of the range extender module comprises a combustion engine or a fuel cell.

* * * * *